United States Patent [19]

Knowles et al.

[11] Patent Number: 4,866,929
[45] Date of Patent: Sep. 19, 1989

[54] HYBRID ELECTROTHERMAL/ELECTROMAGNETIC ARCJET THRUSTER AND THRUST-PRODUCING METHOD

[75] Inventors: Steve Knowles; William W. Smith, both of Seattle, Wash.

[73] Assignee: Olin Corporation, Stamford, Conn.

[21] Appl. No.: 166,088

[22] Filed: Mar. 9, 1988

[51] Int. Cl.[4] .............................................. F02K 11/00
[52] U.S. Cl. ...................................... 60/202; 60/203.1; 60/204
[58] Field of Search ...................... 60/203.1, 202, 200.1, 60/204, 39, 462; 219/121.48, 121.5, 121.51; 313/231.41, 232.51, 231.31, 362.1

[56] References Cited

U.S. PATENT DOCUMENTS

| | | | |
|---|---|---|---|
| 3,297,899 | 1/1967 | Pratt et al. | 313/231.41 |
| 3,441,798 | 4/1969 | Veron | 219/121.48 |
| 4,370,538 | 1/1983 | Browning | 219/121.51 |
| 4,620,080 | 10/1986 | Arata et al. | 219/121.51 |

FOREIGN PATENT DOCUMENTS 2323825 11/1974 Fed. Rep. of Germany ..... 60/203.1

*Primary Examiner*—Donald E. Stout
*Attorney, Agent, or Firm*—Bruce E. Burdick

[57] ABSTRACT

A hybrid electrothermal/electromagentic arcjet thruster has a cylindrical body with a longitudinal central axis, a plurality of electro-thermal propulsion mechanisms defined in the body in radially and circumferentially spaced relation about and extending along the central axis, and an electromagnetic propulsion mechanism defined in the body coaxially along the central axis thereof, between the electrothermal propulsion mechanisms and extending downstream thereof. Each electrothermal propulsion mechanism has tandemly-arranged constriction and expansion zones and are operable to concurrently receive a flow of gaseous propellant through the constriction zone and generate an electric arc therethrough to the expansion zone. The arcs interact with the propellant flows such that the latter are partially ionized and electrothermally accelerated through the expansion zones. The electromagnetic propulsion mechanism has an expansion chamber which communicates with, and extends downstream of, the expansion zones. The electromagnetic propulsion mechanism is operable to concurrently receive the flows of electrothermally-accelerated partially-ionized propellant in the expansion chamber and generate a radial current flux and an azimuthal magnetic field which interact with one another and with the flow of propellant such that the latter is electromagnetically accelerated at a higher rate than the electrothermal acceleration thereof.

32 Claims, 1 Drawing Sheet

HYBRID ELECTROTHERMAL/ELECTROMAGNETIC ARCJET THRUSTER AND THRUST-PRODUCING METHOD

CROSS REFERENCE TO RELATED APPLICATIONS

Reference is hereby made to the following copending U.S. patent applications dealing with related subject matter and assigned to the assignee of the present invention:

1. "Improved Efficiency Arcjet Thruster with Controlled Arc Startup and Steady State Attachment" by S. C. Knowles and W. W. Smith, assigned U.S. Ser. No. 889,451 and filed July 23, 1986 now U.S. Pat. No. 4,800,716 issued January 31, 1989.

2. "Arcjet Thruster with Improved Arc Attachment for Enhancement of Efficiency" by W. W. Smith and S. C. Knowles, assigned U.S. Ser. No. 103,471 and filed October 01, 1987.

BACKGROUND OF THE INVENTION

1. Field of the Invention

The present invention generally relates to small propulsion systems for maneuvering spacecraft and, more particularly, is concerned with a hybrid electrothermal/electromagnetic arcjet thruster and thrust-producing method.

2. Description of the Prior Art

Arcjet Electrothermal (AJET) thrusters and magnetoplasmadynamic (MPD) thrusters are two types of electric propulsion mechanisms which utilize two different means of converting electrical energy to kinetic energy. These two different types of electric propulsion systems were actively researched during the early 1960's and thereafter generally ignored as requiring electric power far beyond that available to spaceships at that time and efforts were instead directed toward combustion type liquid and solid fuel rockets. MPD thruster are thought to be much more efficient that AJET thrusters, but require much more power. With recent advances in space ship electrical power sources, sufficient power is now possible to run small AJET thrusters but not MPD thruster on a spaceship or satellite. For an explanation from a historical perspective of the construction and operation of AJET and electromagnetic MPD types of arcjet thrusters, attention is directed to the following publications: "Physics of Electric Propulsion" by R. G. Jahn, McGraw-Hill Book Company, (hereinafter "Jahn") 1968, and "Electromagnetic Propulsion", McGraw-Hill Encyclopedia of Science and Technology, 1977, Vol. 4, pages 552–556.

Aside from the electric power requirements, there are inherent inefficiencies associated with each of these different propulsive mechanisms. In the AJET thruster, frozen flow losses associated with ionization and dissociation of the propellant waste a large portion of the input power leading to a low over all efficiency (less than 50%). In the MPD thruster, obtaining useful electromagnetic acceleration requires high current levels to convert the propellant into an electrically conductive moving plasma, that is to both substantially ionize the propellant and to accelerate the propellant ions. Typically the thermal energy of the propellant remaining from the ionization process is lost because of the poor expansion characteristic of MPD thruster designs. Upwards of a mega watt of power would be required to run an MPD steady state. In addition, a mega watt MPD steady state thruster would be many years of research away because of erosion and facility problems.

The arcjet as developed is well suited for geosynchronous and orbit transit missions, even with its low efficiency. For interplanetary missions and for larger spacecraft in or rear earth, however, a higher specific impulse, higher efficiency thruster would be needed. The MPD does not meet this need because of its development status and because of the very large power levels required. In view of this status, the availability of an alternative electric propulsion mechanism to either one of these two types which might produce substantially more efficiency and specific impulse than an AJET thruster but not require so much electrical power as an MPD would be highly desirable.

SUMMARY OF THE INVENTION

The present invention provides a hybrid electrothermal/electromagnetic thruster (shortened hereinafter to a "Hybrid arcjet thruster") and thrust-producing method designed to satisfy the aforementioned needs. Although nearly twenty years ago in 1968 on pages 213 and 323 of the above-cited Jahn book, the author alludes to a hybrid AJET-MPD propulsion system as being an untried possibility which might have even more shortcomings to the best knowledge of the inventors herein that was never done and no hardware has heretofore ever been made to efficiently combine AJET and MPD thrusters in a single thruster unit as described below. The hybrid arcjet thruster of the present invention uniquely combines both electrothermal and electromagnetic plasma acceleration effects in a single consolidated acceleration mechanism. Its goal is to efficiently take advantage of the positive features of each accelerating mechanism without requiring excessive electrical power supplies or incurring prohibitive energy losses. It is designed to provide higher specific impulse levels than can be obtained with an AJET thruster alone, while operating at power levels lower than required by an MPD thruster alone. The hybrid thruster also is thought to have an acceptable conversion efficiency which is significantly greater than the current AJET thrusters.

More particularly, in the hybrid arcjet thruster and thrust-producing method of the present invention, acceleration of a gaseous propellant for the generation of thrust occurs in a two-stage process. First, a high pressure arc typical of an electrothermal thruster is established to partially ionize the propellant and to provide electro-thermal acceleration in an expansion zone. The exhaust products of this first step of the process are then passed into an open throated low pressure area of an expansion chamber typical of an electromagnetic MPD thruster.

Second, a strong radial electric discharge is established which accelerates the ion/electron pairs with $j \times B$ force components in the axial direction. The result is a high specific impulse, moderately efficient thruster capable of operating at power levels below those required for electromagnetic MPD thrusters.

A unique feature of this hybrid thruster concept is the incorporation and orientation of the basic components of several electrothermal arcjet thrusters (being four in number in the illustrated embodiment) about a central electromagnetic cathode to generate and contain a symmetric hot plasma that then feeds into the electromagnetic acceleration or thrust expansion chamber.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
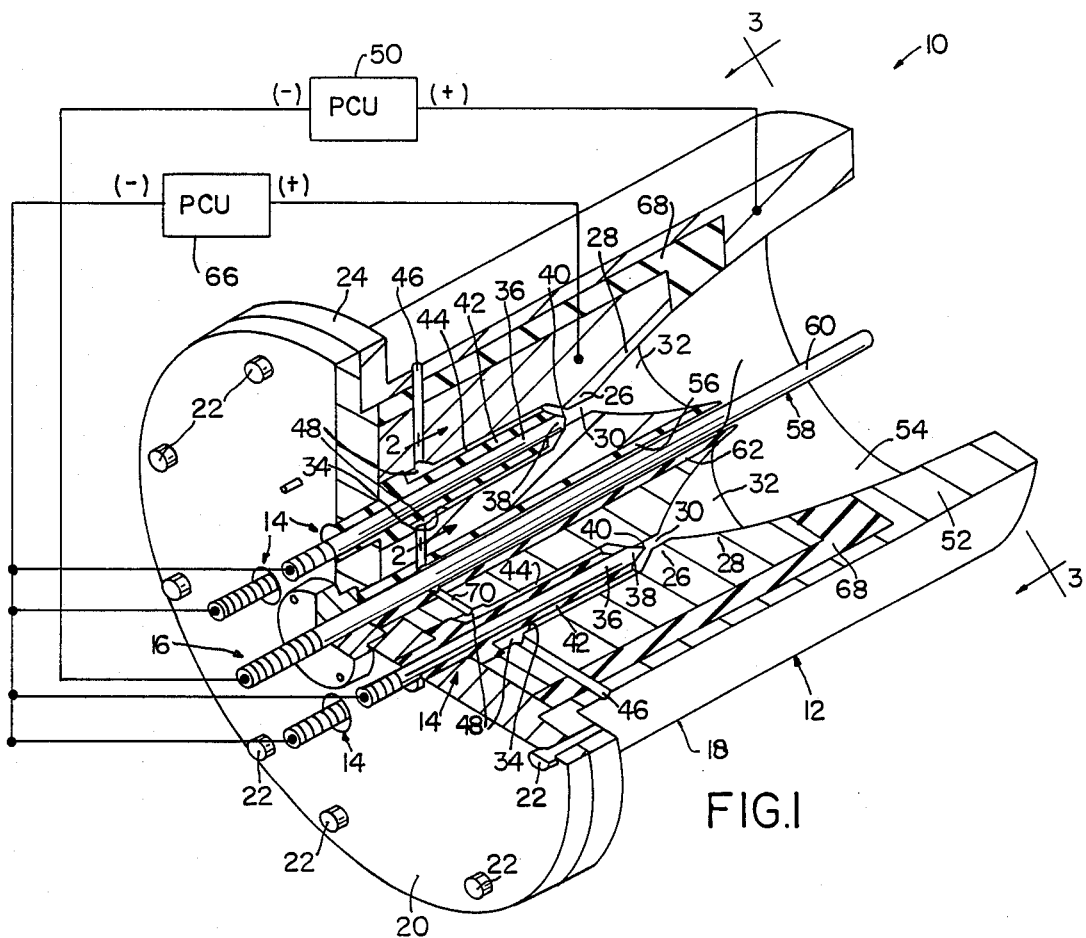
FIG. 1 is a perspective view, with portions broken away and sectioned, of the hybrid arcjet thruster constructed in accordance with the principles of the present invention.
Figure 3:
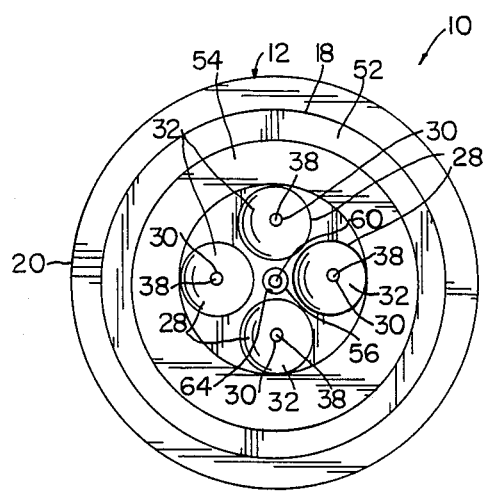
FIG. 3 is an end elevational view, on a reduced scale, of the hybrid arcjet thruster as seen along line 3—3 of FIG. 1.

Referring now to the drawings, and particularly to FIGS. 1 and 3, there is shown, in a perspective view, a preferred embodiment of the hybrid arcjet thruster of the present invention, generally indicated by the numeral 10. In its basic components, the hybrid arcjet thruster 10 includes a cylindrical electrically-conductive body 12 having a longitudinal central axis A, a plurality of electrothermal propulsion mechanisms 14 (preferably four in number) defined in the body 12 in radially and circumferentially spaced, symmetrical relation about and extending along the central axis A, and an electromagnetic propulsion mechanism 16 defined in the body 12 coaxially along the central axis A thereof, between the electrothermal propulsion mechanisms 14 and extending downstream thereof. The cylindrical body 12 is composed of a cylindrical main body portion 18 and a flat end plate portion 20. The end plate portion 20 is attached to the main body portion 18 by a series of screws 22 threaded into a peripheral flange 24 on the main body portion 18.

Each of the electrothermal propulsion mechanisms 14 of the hybrid arcjet thruster 10 includes an annular-shaped constrictor 26 and an annular-shaped nozzle 28 defined in the body 12 in tandem relation and having surfaces which respectively define tandemly-arranged constriction and expansion zones 30, 32. The main body portion 18 has a plurality of elongated bores 34 defined therein in radially and circumferentially spaced relation about the central axis A which are axially aligned and communicate respectively with the constrictors 26 and their respective constriction zones 30.

Each electrothermal propulsion mechanism 14 also includes an elongated electrically-conductive cathode member 36 mounted to the end plate portion 20 of the body 12 and inserted within one of the bores 34. Each cathode member 36 has a conical-shaped end tip 38 disposed adjacent to, and upstream of, the entrance to a respective one of the constrictors 26 to define a gap 40 therebetween. Also, an insulative sleeve 42 is disposed snugly about each cathode member 36 in each of the bores 34 such that an annular propellant flow passage 44 is defined about and extends along the sleeve 42 and communicates at its downstream end with the respective constriction zone 30 of the constrictor 26.

Each electrothermal propulsion mechanism 14 is operable concurrently to receive a flow of gaseous propellant via each flow passage 44 through the constriction zone 30 of each constrictor 26 and to generate an electric arc running from the cathode member tip 38 through the constriction zone to the expansion zone 32 where it attaches to the wall of the nozzle 28. For providing propellant flow and electric arc generation, each electrothermal propulsion mechanism 14 is associated with means for supplying flow of propellant to the constrictor 26 of each mechanism 14 and means for applying an electrical potential to the nozzle 28 and the cathode member 36 of each mechanism 14.

Figure 2:
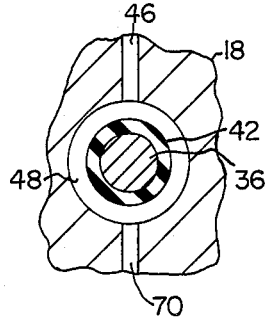
FIG. 2 is a cross-sectional view of the hybrid arcjet thruster taken along line 2—2 of FIG. 1.

The propellant flow supplying means includes a series of paths 46 defined in the main body portion 18 and extending radially with respect to the central axis A of the body 12 from the exterior of the body 12 into communication with each bore 34 defined therein. There is a separate path 46 to each bore 34. Also, the propellant flow supplying means includes an annular-shaped distribution plenum 48, as shown in FIG. 2, encircling each bore 34 to provide communication of propellant flow uniformly with the upstream end of the passage 44 defined by the respective bore 34 about the insulative sleeve 42 which, in turn, communicates with the corresponding constriction zone 30.

The electrical potential applying means is a power conditioning unit 50 which is electrically connected between the nozzles 28 (anodes) and the cathode members 36 of the respective electrothermal propulsion mechanisms 14. The unit 50 is operable in a known manner for establishing an electrical potential therebetween, being positive at the nozzle 28 and negative at the cathode member 36, to initiate generation of an electric arc across the gap 40 through the constriction zone 30 and into the expansion zone 32. The power conditioning unit 50 is represented in block form since its components are well known in the art, and to reproduce them in detail would only serve to increase the complexity of the explanation of the hybrid arcjet thruster 10 without adding to its clarity.

The electric arcs so initiated in the electrothermal mechanisms 14 interact with the propellant flows through the constrictors 26 thereof such that the propellant flows are partially ionized and electrothermally accelerated from the constriction zones 30 through the expansion zones 32.

The electromagnetic propulsion mechanism 16 of the hybrid arcjet thruster 10 includes an annular-shaped large nozzle 52 defined in the main body portion 18 downstream of the nozzles 28 of the electrothermal propulsion mechanisms 14. The large nozzle 52 has a conical surface which defines an expansion chamber 54. The expansion chamber 54 communicates with, and extends downstream of, the expansion zones 32 of the electro-thermal propulsion mechanisms 14 adapting it to receive the flows of electrothermally-accelerated partially-ionized propellant from the expansion zones 32. The main body portion 18 has an elongated channel 56 defined therein coaxially along its central axis A which is aligned and communicates with the expansion chamber 54.

The electromagnetic propulsion mechanism 16 also includes an elongated electrically-conductive cathode rod 58 mounted to the end plate portion 20 of the body 12 and inserted within the channel 56 so as to lie along the central axis A of the body 12. The cathode rod 58 has a downstream end portion 60 extending centrally through the large nozzle 52 and its expansion chamber 54. Also, an insulative sleeve 62 is disposed snugly about the cathode rod 58 in the channel 56 such that an annular propellant flow passage orifice 64 is defined about and extends along the sleeve 62 and communicates at its downstream end with the expansion chamber 54.

The electromagnetic propulsion mechanism 16 is operable concurrently to receive the flows of electrothermally-accelerated partially-ionized propellant from the expansion zones 32 and to generate a current flux and a magnetic field in respectively radial and azimuthal directions relative to the central axis A between the cathode rod 58 and the wall of the large nozzle 52. For providing current flux generation, the electromagnetic propulsion mechanism 16 is associated with means for supplying an electrical potential to the large nozzle 52 and the cathode rod 58.

The electrical potential applying means is another power conditioning unit 66, substantially similar to unit 50 associated with the electrothermal mechanisms 14. The unit 66 is electrically connected between the large nozzle 52 and the cathode rod 58. The unit 66 is operable in a known manner for generating the radial current flux and azimuthal magnetic field across and in the expansion chamber 54. The unit 66 is represented in block form since its components are well know in the art, and to reproduce them in detail would only serve to increase the complexity of the explanation of the hybrid arcjet thruster 10 without adding to its clarity.

It should be mentioned at this point that the electrical potential applied by unit 66 to the electromagnetic propulsion mechanism 16 is at a higher current and lower voltage than that applied by the unit 50 to the electrothermal propulsion mechanism 14. Also, an annular-shaped insulative section 68 in the main body portion 18 is located between the large nozzle 52 of the electromagnetic propulsion mechanism 16 and the constrictor 26 and nozzle 28 of the electrothermal propulsion mechanism 14 for electrically isolating the electromagnetic mechanism 16 from the electrothermal mechanism 14.

The radial current flux and azimuthal magnetic field so initiated in the electromagnetic propulsion mechanism 16 interact with one another and with the flow of electrothermally-accelerated partially-ionized propellant received in the expansion chamber 54 of the large nozzle 52 such that the propellant flow is electro-magnetically accelerated therefrom at a higher rate than the electrothermal acceleration thereof from the expansion zones 30 of the nozzles 28.

Additionally, propellant flow pathways 70 are defined in the main body portion 18 extending between and providing communication with the distribution plenums 48 and the orifice 64 defined in the central channel 56 about the insulative sleeve 62. The residual propellant flow through the orifice 64 and along the cathode rod 58 and insulative sleeve 62 is provided for cooling the cathode rod. It should be understood that the major portion of the propellant flow passes to the mechanisms 14, while only a small amount is routed along the cathode rod 58 for cooling the same. Most of the propellant gas is injected via the flow passages 44 tangentially about the electrothermal cathode member 36 to establish a vortex flow field in the constrictors 26.

A unique feature of the present invention is the orientation of the four electrothermal propulsion mechanisms 14 around a central cathode rod 56 of an electromagnetic propulsion mechanism 16 to generate and contain a symmetric hot plasma that then feeds into the electromagnetic acceleration or expansion chamber 54. The central cathode rod 56 produces the azimuthal magnetic field and radial current flux that interact to produce inwardly radial and axial $j \times B$ accelerations. The former is commonly referred to as the pumping force and the latter the blowing force. The blowing force accelerates the plasma generated in the electrothermal mechanism 14 to velocities much higher than can be obtained by purely electrothermal accelerations.

The hybrid arcjet thruster 10 described supra is particularly adapted for use in space vehicles with available power levels of greater than 100 kW.

It is thought that the present invention and many of its said attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. A hybrid electrothermal/electromagnetic thruster, comprising:
   (a) electrothermal propulsion means having at least one constriction zone and an expansion zone tandemly-arranged with said constriction zone, said electrothermal propulsion means being operable to concurrently receive a flow of gaseous propellant through said constriction zone and generate an electric arc through said constriction zone to said expansion zone, said arc interacting with the propellant flow such that the flow of propellant is partially ionized and electrothermally heated and accelerated from said constriction zone through said expansion zone; and
   (b) electromagnetic propulsion means extending downstream of said electrothermal propulsion means and having an expansion chamber communicating with, and extending downstream of, said expansion zone of said electrothermal propulsion means, said electromagnetic propulsion means being operable to concurrently receive the flow of electrothermally-accelerated partially-ionized propellant through said expansion chamber and generate a radial current flux and an azimuthal magnetic field in said expansion chamber which interact with one another and with the flow of electrothermally-accelerated partially-ionized propellant such that the flow of propellant is electromagnetically accelerated at a higher rate than the electrothermal acceleration thereof.

2. The hybrid thruster as recited in claim 1, wherein said electrothermal propulsion means is a plurality of electrothermal propulsion mechanisms located in radially and circumferentially spaced relation about and extending along a common central axis, each of said electrothermal propulsion mechanisms having said tandemly-arranged constriction and expansion zones.

3. The hybrid thruster as recited in claim 2, wherein each of said electrothermal propulsion mechanisms includes a circular-shaped constrictor and a contoured or conical-shaped nozzle being tandemly-arranged and having surfaces which respectively define said constriction and expansion zones, at least said nozzle being electrically conductive and constituting an anode.

4. The hybrid thruster as recited in claim 3, wherein each of said electrothermal propulsion mechanisms also includes an electrically-conductive cathode member having a tip disposed adjacent to, and upstream of, said constrictor.

5. The hybrid thruster as recited in claim 4, wherein said electrothermal propulsion means further includes means for applying an electrical potential to said nozzle and said cathode member of each electrothermal propulsion mechanism for generating said electric arc through said constriction zone to said expansion zone thereof.

6. The hybrid thruster as recited in claim 3, wherein said electrothermal propulsion means further includes means for supplying the flow of propellant to said constrictor of each of said electrothermal propulsion mechanisms.

7. The hybrid thruster as recited in claim 1, wherein said electromagnetic propulsion means is an electromagnetic propulsion mechanism located coaxially along a central axis.

8. The hybrid thruster as recited in claim 7, wherein said electromagnetic propulsion mechanism includes an annular-shaped electrically-conductive large nozzle defining said expansion chamber and an electrically-conductive cathode rod disposed along said central axis and having a downstream end portion extending through said expansion chamber defined by said large nozzle.

9. The hybrid thruster as recited in claim 8, wherein said electromagnetic propulsion means further includes means for applying an electrical potential to said large nozzle and said cathode rod of said electrothermal propulsion mechanism for generating said radial current flux and azimuthal magnetic field in said expansion chamber.

10. The hybrid thruster as recited in claim 8, wherein said electromagnetic propulsion means further includes means for supplying flow of propellant about and along said cathode rod to provide cooling thereof.

11. A hybrid electrothermal/electromagnetic thruster, comprising:
(a) a body having a longitudinal central axis;
(b) a plurality of electrothermal propulsion mechanisms defined in said body in radially and circumferentially spaced relation about and extending along said central axis thereof, each of said electrothermal propulsion mechanisms having tandemly-arranged constriction and expansion zones and being operable to concurrently receive a flow of gaseous propellant through said constriction zone and generate an electric arc through said constriction zone to said expansion zone, said arcs interacting with the propellant flows such that the propellant flows are partially ionized and electrothermally accelerated from said constriction zones through said expansion zones; and
(c) an electromagnetic propulsion mechanism defined in said body coaxially along said central axis thereof, between said electrothermal propulsion mechanisms and extending downstream thereof, said electro-magnetic propulsion mechanism having an expansion chamber communicating with, and extending downstream of, said expansion zones of said electro-thermal propulsion mechanisms, said electromagnetic propulsion mechanism being operable to concurrently receive the flows of electrothermally-accelerated partially-ionized propellant in said expansion chamber from said expansion zones and generate a current flux and a magnetic field in respectively radial and azimuthal directions relative to said central axis, said radial current flux and azimuthal magnetic field interacting with one another and with the flow of electrothermally-accelerated partially-ionized propellant such that the flow of propellant is electromagnetically accelerated at a higher rate than the electrothermal acceleration thereof.

12. The hybrid thruster as recited in claim 11, wherein each of said electrothermal propulsion mechanisms includes a circular-shaped constrictor and a contoured or conical-shaped nozzle being defined in said body in tandem relation and having surfaces which respectively define said constriction and expansion zones, at least said nozzle being electrically conductive and constituting an anode.

13. The hybrid thruster as recited in claim 12, wherein each of said electrothermal propulsion mechanisms also includes an electrically-conductive cathode member having a tip disposed adjacent to, and upstream of, said constrictor.

14. The hybrid thruster as recited in claim 13, further comprising:
(d) means for applying an electrical potential to said nozzle and said cathode member of each electrothermal propulsion mechanism for generating said electric arc through said constriction zone to said expansion zone thereof.

15. The hybrid thruster as recited in claim 13, further comprising:
(d) means for supplying flow of propellant to said constrictor of each of said electrothermal propulsion mechanisms.

16. The hybrid thruster as recited in claim 15, wherein said propellant supplying means includes a distribution plenum communicating with each of said constrictors.

17. The hybrid thruster as recited in claim 16, wherein said body has a plurality of elongated bores defined therein in radially and circumferentially spaced relation about said central axis which communicate respectively with said constrictors of said electrothermal propulsion mechanisms, each of said bores receiving one of said cathode members therethrough so as to define a propellant flow passage which extends along and about each of said cathode members between said distribution plenum and said constrictors.

18. The hybrid thruster as recited in claim 17, wherein an insulative sleeve is disposed about said cathode member in each of said bores.

19. The hybrid thruster as recited in claim 15, wherein said electromagnetic propulsion mechanism includes an annular-shaped electrically-conductive large nozzle being defined in said body and having a surface which defines said expansion chamber.

20. The hybrid thruster as recited in claim 19, further comprising:
(e) an annular-shaped insulative section defined in said body between said large nozzle of said electromagnetic propulsion mechanism and said constrictor and nozzle of said electrothermal propulsion mechanism.

21. The hybrid thruster as recited in claim 19, wherein said electromagnetic propulsion mechanism also includes an electrically-conductive cathode rod disposed along said central axis and having a downstream end portion extending through said large nozzle and said expansion chamber thereof.

22. The hybrid thruster as recited in claim 21, further comprising:
(e) first means for applying an electrical potential to said large nozzle and said cathode rod for generating said radial current flux and azimuthal magnetic field in said expansion chamber.

23. The hybrid thruster as recited in claim 22, further comprising:
(f) second means for applying an electrical potential to said nozzle and said cathode member of each electrothermal propulsion mechanism for generating said electric arc through said constriction zone to said expansion zone thereof.

24. The hybrid thruster as recited in claim 23, wherein said first electrical potential applying means applies an electrical potential at a higher current and lower voltage than that applied by said second electrical potential applying means.

25. The hybrid thruster as recited in claim 21, wherein electro-magnetic propulsion mechanism further includes means for supplying flow of propellant about and along said cathode rod to provide cooling thereof.

26. The hybrid thruster as recited in claim 25, wherein said means of supplying propellant flow to said constrictor of each of said electrothermal propulsion mechanisms is connected in communication with said means for supplying propellant flow for cooling of said cathode rod.

27. The hybrid thruster as recited in claim 25, wherein said body has an elongated channel defined therein coaxially along said central axis which communicate respectively with said expansion chamber, said channel receiving said cathode rod therethrough so as to define a propellant flow passage which extends along and about said cathode rod between said propellant flow supplying means and said expansion chamber.

28. The hybrid thruster as recited in claim 27, further comprising:
(e) an insulative sleeve disposed about said cathode rod in said channel.

29. A hybrid method of electrothermally and electromagnetically producing thrust, comprising the steps of:
(a) receiving flow of gaseous propellant through a constriction zone of an electrothermal propulsion mechanism;
(b) generating an electric arc through the constriction zone to an expansion zone of the electrothermal propulsion mechanism, being tandemly-arranged with, and extending downstream of, the constriction zone, said arc interacting with the propellant flow such that the propellant is partially ionized and electrothermally accelerated from the constriction zone through the expansion zone;
(c) receiving the flow of electrothermally-accelerated partially-ionized propellant in an expansion chamber of an electromagnetic propulsion mechanism which communicates with, and extends downstream from, the expansion zone of the electrothermal propulsion mechanism; and
(d) generating a radial current flux and an azimuthal magnetic field in the expansion chamber of the electromagnetic propulsion mechanism, said radial current flux and azimuthal magnetic field interacting with one another and with the flow of electrothermally-accelerated propellant within the expansion chamber such that the flow of propellant is electromagnetically accelerated through the expansion chamber at a higher rate than the electrothermal acceleration thereof.

30. The hybrid thrust-producing method as recited in claim 29, wherein said electric current flux of said electromagnetic propulsion mechanism is generated at a higher current and lower voltage than said electric arc of said electrothermal propulsion mechanism.

31. A hybrid method of electrothermally and electromagnetically producing thrust, comprising the steps of:
(a) providing an electromagnetic propulsion mechanism along a central axis and a plurality of electrothermal propulsion mechanisms in radially and circumferentially spaced relation about and extending along the central axis, said electromagnetic propulsion mechanism extending downstream of said electrothermal propulsion mechanism;
(b) receiving flows of gaseous propellant through constriction zones of the electrothermal propulsion mechanisms;
(c) generating electric arcs through the respective constriction zones to expansion zones of the electrothermal propulsion mechanisms, being tandemly-arranged with, and extending downstream of, the respective constriction zones, said arcs interacting with the propellant flows such that the propellant is partially ionized and electrothermally accelerated from the constriction zones through the expansion zones;
(d) receiving the flow of electrothermally-accelerated partially-ionized propellant in an expansion chamber of the electromagnetic propulsion mechanism which communicates with, and extends downstream from, the expansion zones of the respective electrothermal propulsion mechanisms; and
(e) generating a current flux and a magnetic field in respective radial and azimuthal directions relative to the central axis, said radial current flux and azimuthal magnetic field interacting with one another and with the flow of electrothermally-accelerated propellant within the expansion chamber such that the flow of propellant is electromagnetically accelerated through the expansion chamber at a higher rate than the electrothermal acceleration thereof.

32. The hybrid thrust-producing method as recited in claim 31, wherein said electric current flux of said electromagnetic propulsion mechanism is generated at a higher current and lower voltage than said electric arc of said electrothermal propulsion mechanism.

* * * * *